United States Patent
Himmele

(10) Patent No.: US 6,369,958 B1
(45) Date of Patent: Apr. 9, 2002

(54) SPORTS BINOCULAR ASSEMBLY

(75) Inventor: Tristram W. Himmele, 614 1st Ave., S., Lake Worth, FL (US) 33460

(73) Assignee: Tristram W. Himmele, Lake Worth, FL (US)

( * ) Notice: Subject to any disclaimer, the term of this patent is extended or adjusted under 35 U.S.C. 154(b) by 0 days.

(21) Appl. No.: 09/523,213

(22) Filed: Mar. 10, 2000

(51) Int. Cl.$^7$ .................................................. G02B 7/02
(52) U.S. Cl. ..................... 359/815; 359/407; 359/408; 359/409; 359/630; 345/7; 345/8; 345/9; 2/209.13; 351/123
(58) Field of Search ................................ 359/815, 407, 359/408, 409, 410, 894, 630, 632; 345/7, 8, 9; 351/123, 158; 2/6, 7, 209.13

(56) References Cited

U.S. PATENT DOCUMENTS

| | | | |
|---|---|---|---|
| 2,986,969 A | 6/1961 | Muncheryan | 88/41 |
| 3,597,041 A | 8/1971 | Frantz | 350/72 |
| 3,741,634 A | 6/1973 | Stoltze | 351/57 |
| 4,077,703 A | 3/1978 | Pablo | 350/145 |
| 4,758,077 A | 7/1988 | Beecher | 350/545 |
| 4,810,057 A | 3/1989 | Dunkley | 350/139 |
| 4,877,318 A | 10/1989 | Miles et al. | 350/569 |
| 5,023,706 A * | 6/1991 | Sandberg | 359/408 |
| 5,179,735 A * | 1/1993 | Thomanek | 359/815 |
| 5,608,808 A * | 3/1997 | Da Silva | 351/123 |
| 5,767,820 A * | 6/1998 | Bassett et al. | 345/8 |
| 5,786,932 A * | 7/1998 | Pniel | 359/409 |
| 5,828,437 A | 10/1998 | Hubert-Habart et al. | 351/44 |
| 6,046,712 A * | 4/2000 | Beller et al. | 345/8 |
| 6,115,846 A * | 9/2000 | Truesdale | 2/209.13 |
| 6,160,666 A * | 12/2000 | Rallison et al. | 359/630 |

* cited by examiner

*Primary Examiner*—Loha Ben

(57) ABSTRACT

A binocular assembly that includes a hands free support mechanism for supporting the binoculars in front of the user's eyes without using any of the user's hands. The hands free support mechanism includes an adjustable head securing strap and a pair of positioning arms. Each of the pair of positioning arms rigidly extends from one of the binocular elements of a user adjustable binocular assembly at an angle "A" of between twenty-five and forty-five degrees.

1 Claim, 1 Drawing Sheet

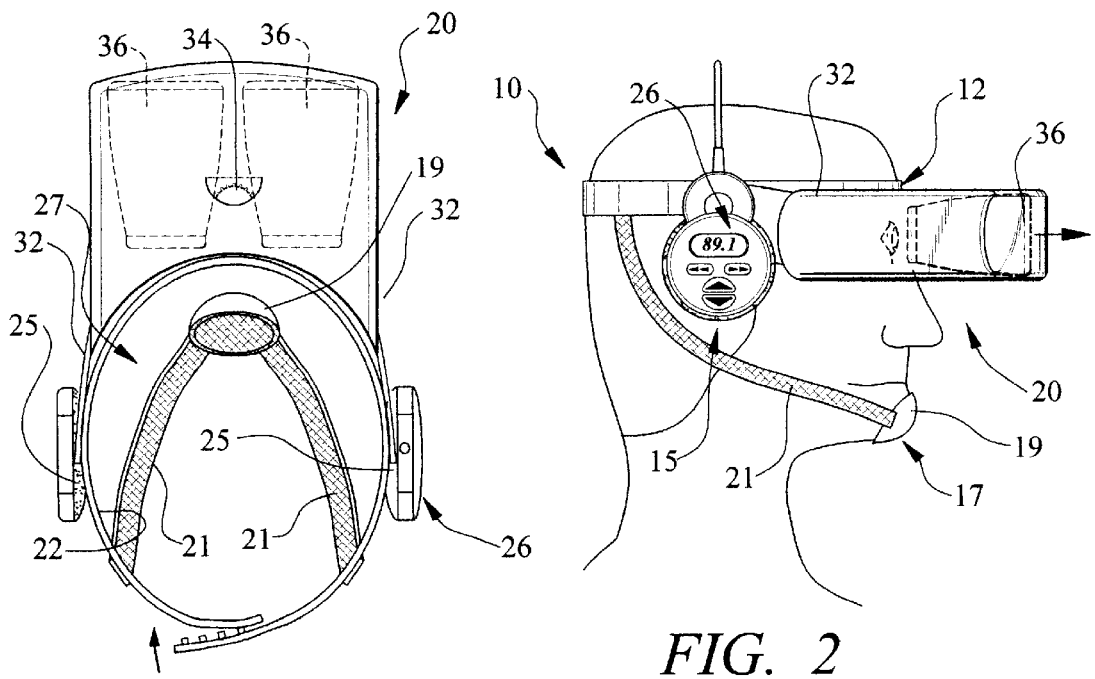
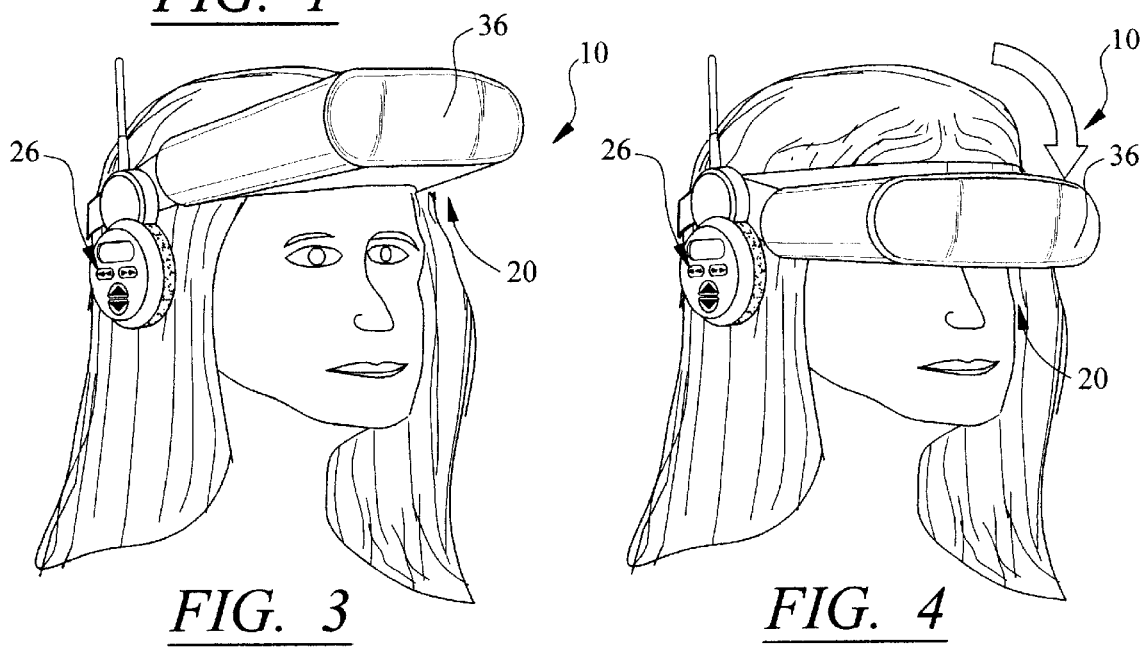
FIG. 1
FIG. 2
FIG. 3
FIG. 4

SPORTS BINOCULAR ASSEMBLY

TECHNICAL FIELD

The present invention relates to sporting event viewing accessories and more particularly to a sports binocular assembly that includes an adjustable head securing strap, an AM/FM/SCANNER radio with earphone secured to the adjustable head securing strap, and a user focusable binocular assembly pivotally connected to the adjustable head securing strap by a pair of positioning arms, each rigidly extending from one of the binocular elements at an angle "A" of between twenty-five and forty-five degrees.

BACKGROUND OF THE ART

It is often desirable to use binoculars for better viewing the action while attending sporting events and the like. Although binoculars provide a useful mechanism for enhancing viewing of the event, they are often bothersome because the user must continuously dedicate at least one hand to supporting the binoculars. It would be a benefit, therefore, to have a binocular assembly that included a hands free support mechanism for supporting the binoculars in front of the user's eyes without using any of the user's hands.

GENERAL SUMMARY DISCUSSION OF INVENTION

It is thus an object of the invention to provide a sports binocular assembly that includes an adjustable head securing strap, an AM/FM/SCANNER radio with earphone secured to the adjustable head securing strap, and a user focusable binocular assembly pivotally connected to the adjustable head securing strap by a pair of positioning arms, each rigidly extending from one of the binocular elements at an angle "A" of between twenty-five and forty-five degrees.

Accordingly, a sports binocular assembly is provided. The sports binocular assembly includes an adjustable head securing strap, an AM/FM/SCANNER radio with earphone secured to the adjustable head securing strap, and a user focusable binocular assembly pivotally connected to the adjustable head securing strap by a pair of positioning arms, each rigidly extending from one of the binocular elements at an angle "A" of between twenty-five and forty-five degrees.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein:

FIG. 1 is a top plan view of an exemplary embodiment of the sports binocular assembly of the present invention showing the adjustable head securing strap, the ear muffs, the chin strap assembly, the AM/FM/SCANNER radio with earphone secured to the adjustable head securing strap, and the user focusable binocular assembly pivotally connected to the adjustable head securing strap by a pair of positioning arms, each rigidly extending from one of the binocular elements at an angle "A" of between twenty-five and forty-five degrees.

FIG. 2 is a side plan view of the exemplary sports binocular assembly showing the adjustable head securing strap secured about the top of a user's head, the earphone of the AM/FM/SCANNER radio inserted into the ear of a user, one of the two ear muffs positioned over the user's ear and the ear phone, the optional chin strap assembly secured over the user's chin, and the user focusable binocular assembly pivoted down into the use position in front of the user's eyes by pivoting the pair of positioning arms downward.

FIG. 3 is a perspective view showing the sports binocular assembly in the storage position.

FIG. 4 is a perspective view of the sports binocular assembly in the use position.

EXEMPLARY MODE FOR CARRYING OUT THE INVENTION

FIGS. 1–4 show various aspects of an exemplary embodiment of the sports binocular assembly of the present invention generally designated 10. Sports binocular assembly 10 includes an adjustable head securing strap, generally designated 12; ear muffs, generally designated 15; an AM/FM/SCANNER radio, generally designated 16; a chin strap assembly, generally designated 17; and a user focusable binocular assembly, generally designated 20.

AM/FM/SCANNER radio 16 includes a tuning knob 22 for tuning in AM and FM stations and an earphone 24 and is secured to adjustable head securing strap 12. Ear muffs 15 and chin strap assembly 17 are secured to head securing strap 12. Ear muffs 15 include two support members 23 each supporting a padded ear cover 25. Chin strap assembly 17 includes a chin receiving cup 19 and two strap members 21. User focusable binocular assembly 20 includes a focusing assembly 34 positioned between and in focusing connection with two binocular elements 36 and is pivotally connected with pivot pins 28 to adjustable head securing strap 12 by two positioning arms 32. Each positioning arm 32 rigidly extends from one of the two binocular elements 36 at an angle "A" of thirty degrees. Orienting positioning arms 32 at thirty degrees with respect to the two binocular elements 36 ensures that the two binocular elements 36 are oriented straight ahead when positioning arms 32 are moved from the frictionally held storage position, shown in FIG. 3, to the frictionally held use position shown in FIG. 4.

It can be seen from the preceding description that a sports binocular assembly has been provided that includes an adjustable head securing strap, an AM/FM/SCANNER radio with earphone secured to the adjustable head securing strap, and a user focusable binocular assembly pivotally connected to the adjustable head securing strap by a pair of positioning arms, each rigidly extending from one of the binocular elements at an angle "A" of between twenty-five and forty-five degrees.

It is noted that the embodiment of the sports binocular assembly described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A sports binocular assembly comprising:

an adjustable head securing strap;

an AM/FM/SCANNER radio with earphone secured to said adjustable head securing strap;

ear muffs extending from said adjustable head securing strap;

a chin strap assembly extending from said adjustable head securing strap; and a user focusable binocular assembly pivotally connected to said adjustable head securing strap by a pair of positioning arms, said user focusable binocular assembly including two binocular elements, each of said pair of positioning arms rigidly extending from one of said binocular elements at an angle "A" of between twenty-five and forty-five degrees.

* * * * *